(No Model.) 2 Sheets—Sheet 1.

G. L. KITSON.
LEAD COVERED ELECTRICAL CONDUCTOR OR CABLE.

No. 364,178. Patented May 31, 1887.

WITNESSES:
Geo. F. Byington
M. F. Halleck

INVENTOR,
George L. Kitson
By S. F. Van Stavoren
ATTORNEY (No Model.) 2 Sheets—Sheet 2.

G. L. KITSON.
LEAD COVERED ELECTRICAL CONDUCTOR OR CABLE.

No. 364,178. Patented May 31, 1887.

WITNESSES:
Geo. B. Byington
M. J. Halleck

INVENTOR
George L. Kitson
By S. J. Van Stavoren
ATTORNEY

UNITED STATES PATENT OFFICE.

GEORGE L. KITSON, OF PHILADELPHIA, PENNSYLVANIA, ASSIGNOR, BY DIRECT AND MESNE ASSIGNMENTS, TO THE KITSON ELECTRIC COMPANY, OF CAMDEN, NEW JERSEY.

LEAD-COVERED ELECTRICAL CONDUCTOR OR CABLE.

SPECIFICATION forming part of Letters Patent No. 364,178, dated May 31, 1887.

Application filed December 21, 1886. Serial No. 222,186. (No model.)

*To all whom it may concern:*

Be it known that I, GEORGE L. KITSON, a citizen of the United States, residing at Philadelphia, in the county of Philadelphia and State of Pennsylvania, have invented certain new and useful Improvements in Lead-Covered Electrical Conductors or Cables, of which the following is a specification, reference being had therein to the accompanying drawings, wherein—

Figure 1:
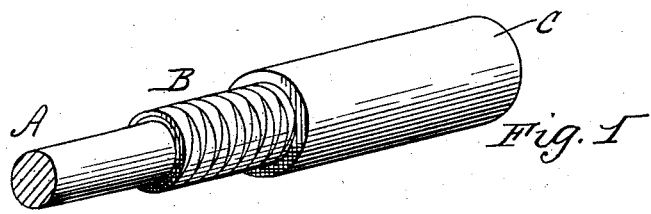
Figure 2:
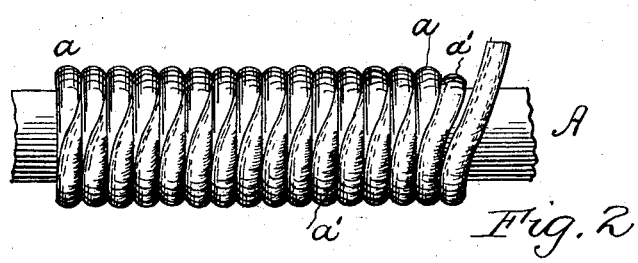
Figure 3:
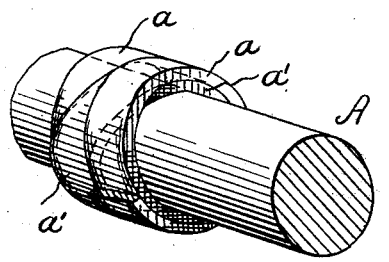
Figure 4:
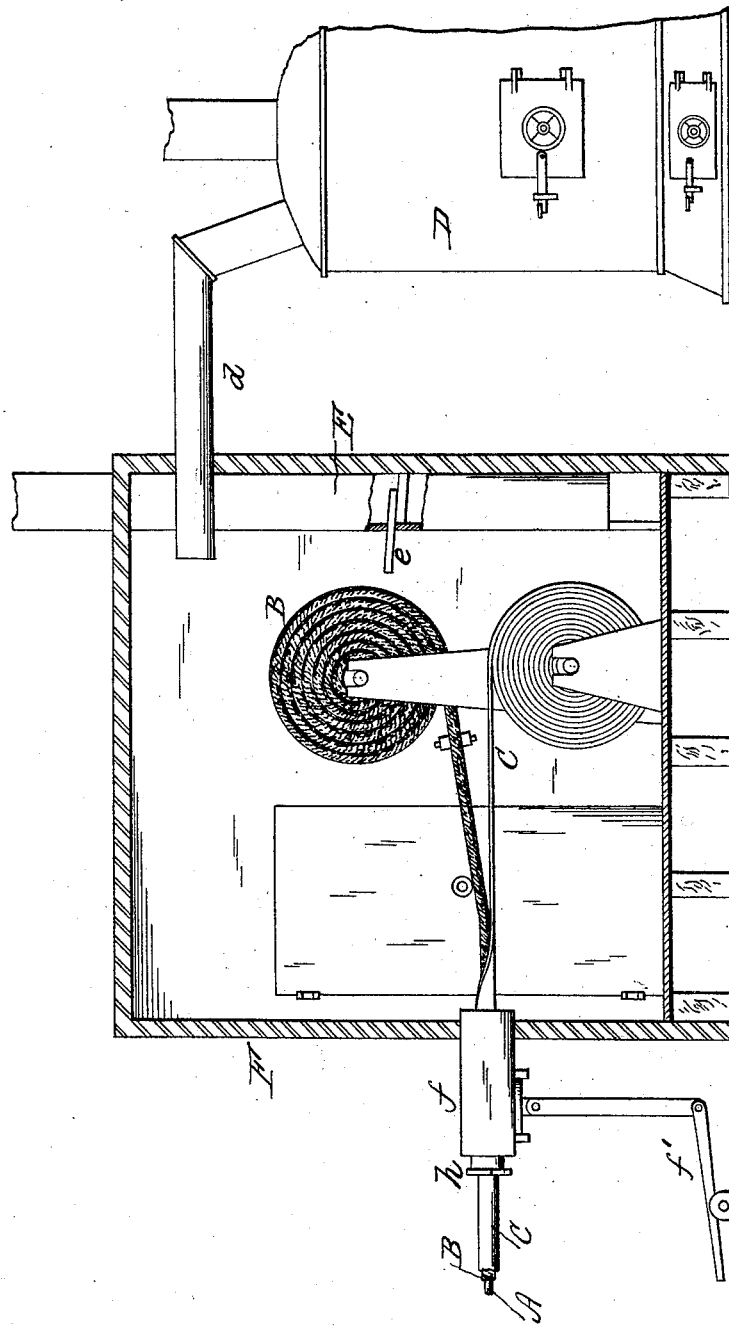

Figure 1 is a perspective of a lead-covered electric conductor or cable embodying my invention. Figs. 2 and 3 are perspectives showing more plainly the way in which the cotton or like insulation is wrapped or coiled upon the conductor or cable, and Fig. 4 is a sectional elevation showing apparatus and method of making the lead-covered conductor or cable.

My invention relates to that form of electric conductors or cables having fibrous insulation and a casing or covering of lead; and it has for its object to produce a cable or conductor of the form described having a high degree of insulation, which is maintained and not lost in use, and which conductor is economically made and is exceedingly effective and durable. To accomplish these objects I wrap or coil upon the conductor a cotton insulation, preferably, or other suitable fibrous material may be substituted, and as this wrapping is effected the conductor is preferably wound upon a reel, which, when full, is placed in a heating-chamber having a high degree of temperature for expelling the moisture from the cotton insulation to make its contained air as dry as it is possible to do. To keep this air dry, or to prevent the cotton insulation from reabsorbing moisture before it is lead-covered, I keep the conductor and its cotton insulation exposed to the same high temperature until they are lead-covered; and, as an additional safeguard against such reabsorption, I prefer to raise the temperature of the lead covering to expel its moisture and keep it dry until after it is wrapped or placed around the conductor and its insulation. If the lead covering used be in the form of a ribbon, which is bent around the conductor and its seam lead-burnt, I prefer to reel the ribbon and suitably place it in the heating-chamber along with the reeled conductor, and then provide for bending the ribbon around the conductor within the heating-chamber or within a passage-way leading from the chamber, and for lead-burning the seam at the exit-opening of the chamber or passage-way. If a seamless lead tube or casing is used, the highly-heated conductor is conveyed through hot-air tubes or passages to the die of the machine in which the seamless lead casing is formed. The lead in this case being molten, its moisture is expelled before incasing itself about the conductor as it passes through the machine.

My invention has for its further object to wind the cotton or other insulation upon the conductor in successive series of transverse coils from the conductor outwardly, so that the slivers or threads are alternately upon the inside and outside of the insulation, and the coils of two adjacent or succeeding series bind one another, to prevent ease of unraveling and of slipping of the outer coils of the insulation one from the other to bunch or accumulate together in passing through a passage-way or a lead pipe or casing-die, said bunching or accumulation heretofore having the effect of filling up the passage-way or die, and thus interfering with or breaking the continuity of the lead casing or covering.

My invention, accordingly, consists of an electrical conductor or cable having an insulation of cotton or other fibrous material and dry air incased in lead, or a lead-covered conductor or cable having an anhydrous fibrous insulation, or an insulation from which the moisture has been expelled, between the conductor and its casing; and, further, of a fibrous insulation composed of successive series of transverse windings or coils which bind one another.

In the drawings, Fig. 1, A represents a wire conductor or cable, B its anhydrous fibrous insulation, and C its lead covering or casing.

The insulation D is preferably composed of cotton threads or slivers wound upon the conductor from end to end, and is made anhydrous, as hereinafter described. The cotton sliver or thread is wound upon the conductor in the following manner: At the beginning of the winding the first coil or layer is wound around the conductor in a circumferential line, or at right angles to the axis of the conductor. A second coil or layer is likewise wound upon the first coil until the starting-point for the said second coil is almost reached, when it is given a pitch or spiral course to bring the sliver or thread from the outside of the insulation to its inside, or to or upon the conductor, for correspondingly winding the first and second coils of another series of the transverse coils succeeding the series first wound, and so on until the length of the conductor is covered with insulation. The latter, therefore, is composed of succeeding series of transverse coils wound from the conductor outwardly; and as many coils may be wound in each series as desired, the last coil having the spiral course to bring the sliver or thread to the conductor for winding the coils of the next series. The sliver or thread of the insulation is alternately upon the outside and inside of the insulation, and the spiral course between the last coil of one series and the first coil of the next series admits of the coils of a succeeding series binding the coils of the preceding series throughout the entire length of the conductor. This binding of the coils prevents unraveling of the insulation from end to end of the conductor, as can be easily done when the insulation is in the form of a continuous spiral or coil, as heretofore wound. This binding also avoids any tendency of the outer coils slipping upon one another to bunch or accumulate when subjected to a drawing action. Hence in passing the conductor with its insulation through a passage-way or a die to lead-cover it the continuity of the lead covering is not broken nor the uniform thickness of the covering varied.

The manner of coiling the insulation B is plainly shown in Figs. 2 and 3, wherein $a$ represents the circumferential coils, and $a'$ the spiral course given to the last or outer coils of the series.

Another advantage derived from winding the insulation B as above described is that should there be any moisture in the insulation, due to absorption, the insulation shrinks from the outside first, and in so doing tightens or more firmly binds the spiral coils, and this in a measure prevents too ready access of moisture to the inner or spiral coils, which are next to the conductor A. This described mode of winding the insulation can be more readily understood when it is stated that in winding the insulation in practice the conductor remains stationary as each series of coils is wound upon it, and is moved or fed through the winding-machine step by step as the last coil of each series is wound, this intermittent feeding of the conductor giving the spiral course to the last coil of the series.

As the insulation is coiled upon the conductor it is preferably wound upon the reel, and when it is full it is placed in any suitable heating-chamber, F, a form of which is shown in Fig. 4, for the purpose of expelling the moisture in the insulation, so as to make it thoroughly anhydrous. This heating-chamber, as shown, has a hot-air flue, $d$, from a furnace or other heater, D, and an exit-flue, E, having a damper, $e$, for carrying off the aqueous vapors. Leading from the heating-chamber F is a passage-way or tube, $f$, in which, if desired, is located a die or other devices for forming the lead casing for the conductor.

In Fig. 4 I have shown the lead covering as composed of a ribbon of sheet-lead, adapted to be bent around the conductor within tube $f$ by means of the suitable die therein, operated by a treadle-motion, $f'$. When this ribbon is used, a reel of it is preferably placed in the heating-chamber F, as indicated, in order that the ribbon may be deprived of its moisture or thoroughly dried before it is bent around the conductor. The temperature of chamber F is preferably raised to a degree approximating the fusing-point of lead, or is such that it will not char the insulation nor melt the lead.

The anhydrous ribbon of lead is first inserted into and drawn through the tube $f$. The conductor, with its insulating-covering, is then passed into tube $f$ and placed upon the ribbon. The ribbon and the conductor are then drawn through the tube, and as this is done the treadle $f'$ is operated to actuate the die or former in tube $f$ and bend the ribbon around the conductor. As the conductor, with its casing, emerges from the exit end of tube $f$, the seam in its covering is, by any suitable means, lead-burnt, or otherwise sealed up. At the exit end of tube $f$ is a suitable stuffing-box, $h$, to prevent the escape of hot air from the chamber F.

It is obvious from the foregoing that the insulation of the conductor and the lead ribbon are thoroughly dried in chamber F, and as neither the insulation nor the lead come in contact with the external air before the ribbon is bent around the insulation, it has no opportunity to reabsorb any moisture, and it is, when covered by the lead, perfectly anhydrous. A lead-covered conductor or cable so made, therefore, has an anhydrous fibrous insulation, which gives to the conductor a very high degree of insulation, and this degree is maintained or remains uniform.

I have described a particular mode of coiling the anhydrous insulation; but I do not confine myself thereto, as it is obvious that any desired mode of winding the insulation may be employed. So, too, while I have stated that I prefer to use a cotton or fibrous insulation and a lead covering, I do not wish it to be understood that I limit myself to the same, as any other suitable insulation of an analogous character may be employed, and any suitable metallic compounds or alloys or other material may be substituted for the lead.

The above-described drying of the insulation on the conductor and of the lead ribbon for the casing, it will be noted, is accomplished before the conductor and its insulation are incased in the lead ribbon—that is to say, that the insulation and the ribbon of lead are separately dried and kept in an anhydrous condition until the cable is completed, so that the insulation has no possible opportunity to reabsorb moisture during the finishing of the cable. This method is contradistinguished from a drying process in which the conductor and its insulation are first dried and the insulation then covered with a coating of plastic material, as in so coating the insulation no provision is made to prevent the insulation reabsorbing moisture from the air before it is coated, and from absorbing moisture from the coating as it is applied to the insulation, in which case the insulation is not anhydrous.

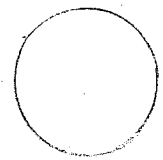

What I claim is—

1. An electric conductor or cable having a fibrous insulation from which the moisture has been expelled and a covering of lead for the insulation, substantially as set forth.

2. A lead-covered electric conductor or cable having an insulation of fibrous material from which the moisture has been expelled between the conductor and its covering, substantially as set forth.

3. An electric conductor or cable having an insulation composed of succeeding series of coils wound from the conductor outwardly, and the last or outer coil of each series passing to the conductor to form the first coil of the succeeding series, substantially as set forth.

4. An electric conductor having an insulation composed of succeeding series of coils wound from the conductor outwardly, and the last coil of each series having a partly-spiral course passing to the conductor to alternately bring the line of coiling on the inside and outside of the body of the insulation and effect a binding of the outer coils of the series, substantially as set forth.

5. The method herein described of making lead-covered electrical conductors having an anhydrous insulation, consisting of separately heating or drying the insulation after it is wound upon the conductor, and then lead-covering it without exposing the insulation to the atmosphere, substantially as set forth.

6. The method herein described of making lead-covered electrical conductors having an anhydrous insulation, consisting in winding or placing the insulation upon the conductor, then separately heating the insulation and the lead for covering it, and then incasing the insulation in the lead covering without exposing them to the atmosphere, substantially as set forth.

In testimony whereof I affix my signature in presence of two witnesses.

GEORGE L. KITSON.

Witnesses:
S. J. VAN STAVOREN,
CHAS. F. VAN HORN.